US006696683B2

United States Patent
Hokoi

(10) Patent No.: US 6,696,683 B2
(45) Date of Patent: Feb. 24, 2004

(54) IMAGE SCANNING APPARATUS, CONTROL PROGRAM OF THE SAME, AND STORAGE MEDIUM FOR STORING CONTROL PROGRAM OF THE SAME

(75) Inventor: Hayato Hokoi, Sakura (JP)

(73) Assignee: Nikon Corporation, Tokyo (JP)

( * ) Notice: Subject to any disclaimer, the term of this patent is extended or adjusted under 35 U.S.C. 154(b) by 59 days.

(21) Appl. No.: 09/938,658

(22) Filed: Aug. 27, 2001

(65) Prior Publication Data

US 2002/0030157 A1 Mar. 14, 2002

(30) Foreign Application Priority Data

Aug. 28, 2000 (JP) ........................................ 2000-257501

(51) Int. Cl.[7] .................................................. H01J 3/14
(52) U.S. Cl. ........................ 250/234; 358/475; 358/509
(58) Field of Search ........................ 250/208.1, 214 R, 250/559.4, 559.29, 559.3, 559.22, 559.02, 234–236; 358/514, 412, 474, 509, 475; 356/399–401, 429–430, 238.1

(56) References Cited

U.S. PATENT DOCUMENTS 5,619,049 A * 4/1997 Kim ........................... 257/223
6,037,584 A * 3/2000 Johnson et al. ............. 250/235
6,301,024 B1 * 10/2001 Yamamoto .................. 358/509

* cited by examiner

Primary Examiner—David Porta
Assistant Examiner—Patrick J. Lee
(74) Attorney, Agent, or Firm—Oliff & Berridge PLC

(57) ABSTRACT

The invention provides an image scanning apparatus capable of obtaining an image signal in high quality even with existence of a non-effective picture in a scanning area. The apparatus comprises: an radiation unit for radiating scanning light onto a scanning area where an original is arranged; a photodetector for detecting an optical image formed by the scanning light which is reflected in the scanning area or transmits therethrough; a test drive unit for driving the radiation unit and the photodetector under predetermined drive condition; and an adjusting unit for adjusting the drive condition for the radiation unit and the photodetector in accordance with an output signal outputted from the photodetector by the driving. The photodetector has an overflow drain mechanism, and the adjusting unit adjusts an exposure of the photodetector at a brightest point of an effective picture of the optical image to approach its quantization exposure limit.

15 Claims, 13 Drawing Sheets

FIG.6
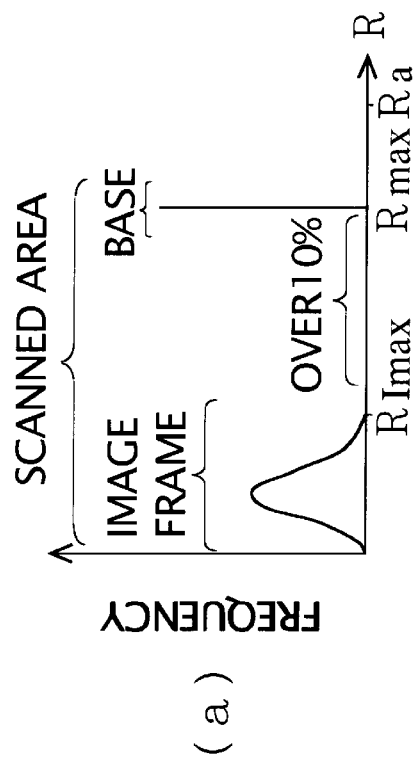
(a)
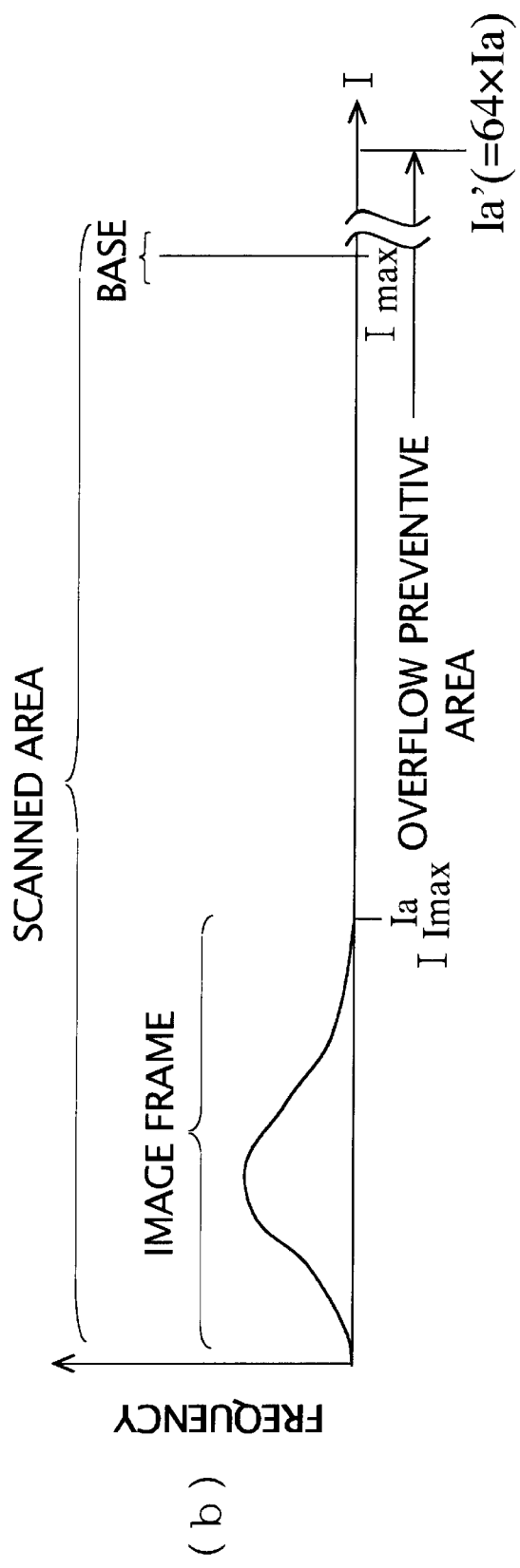
(b)

FIG.9
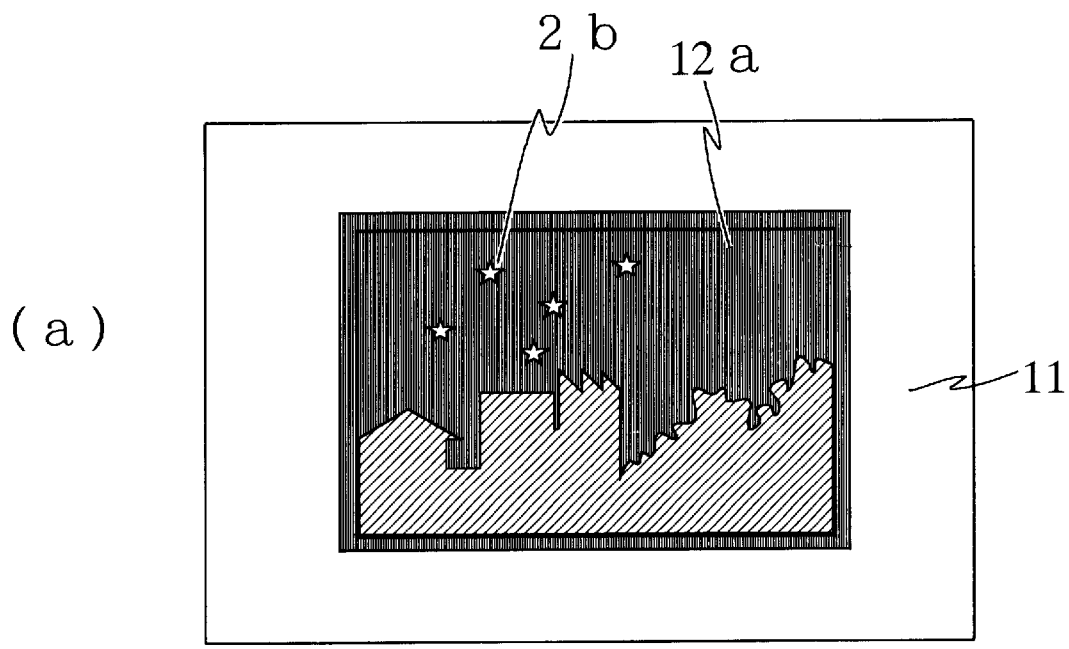
(a)
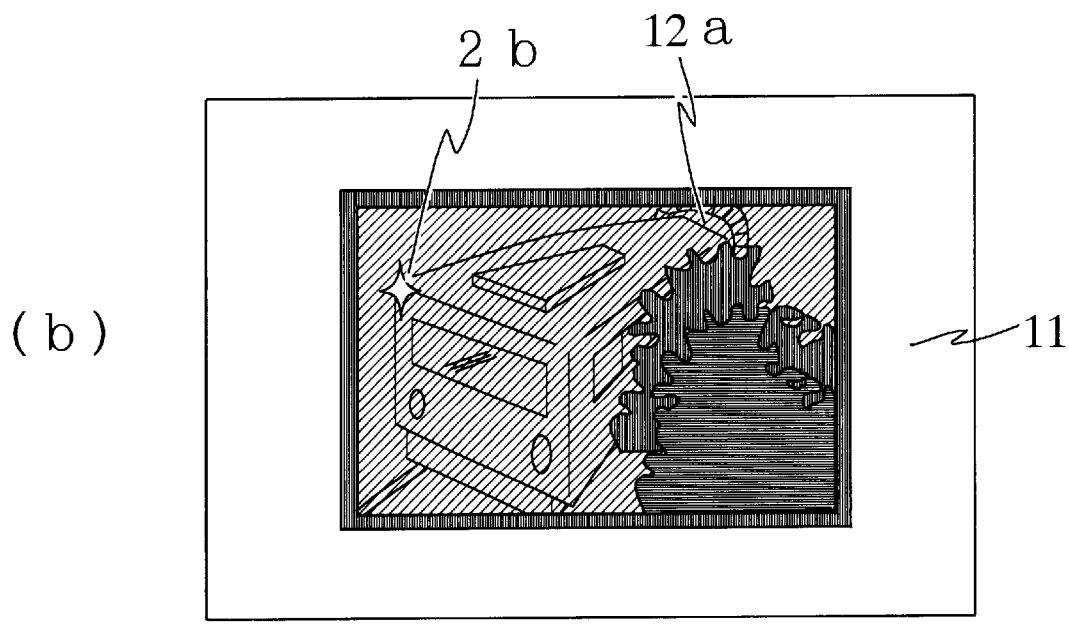
(b)

FIG.11
(a)
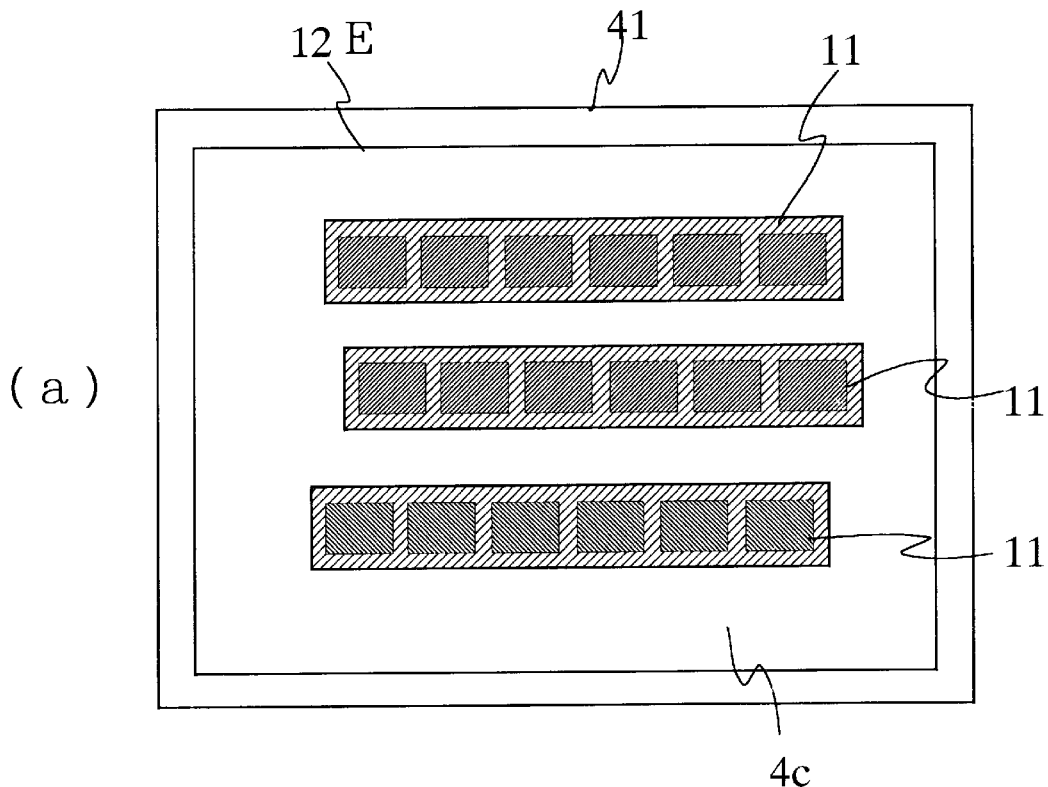
(b)
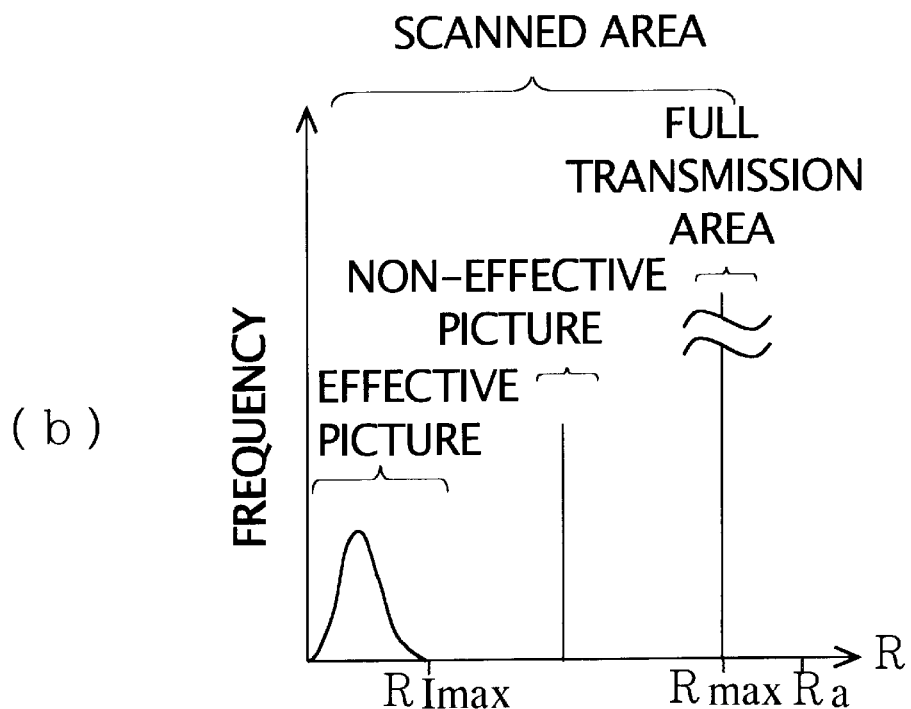

FIG.12
(a)
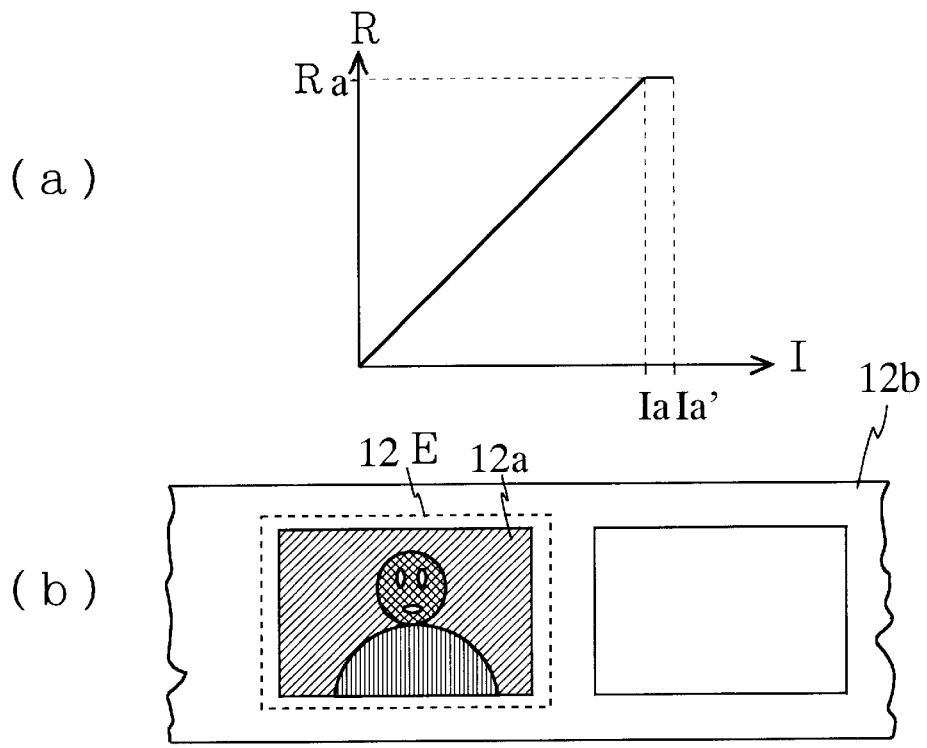
(b)
(c)
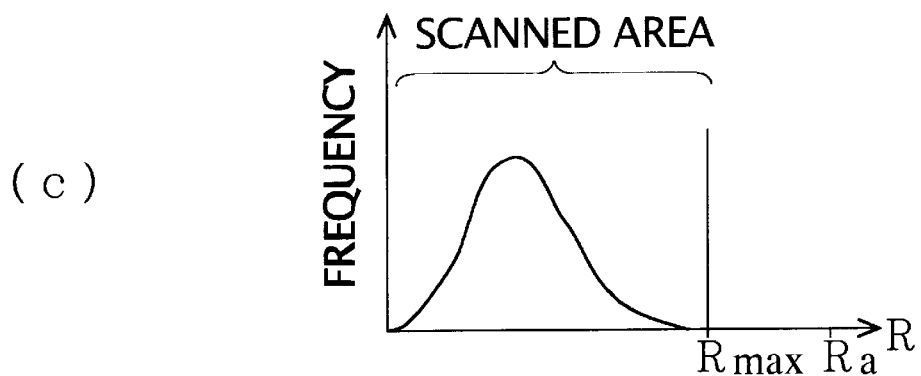
(d)
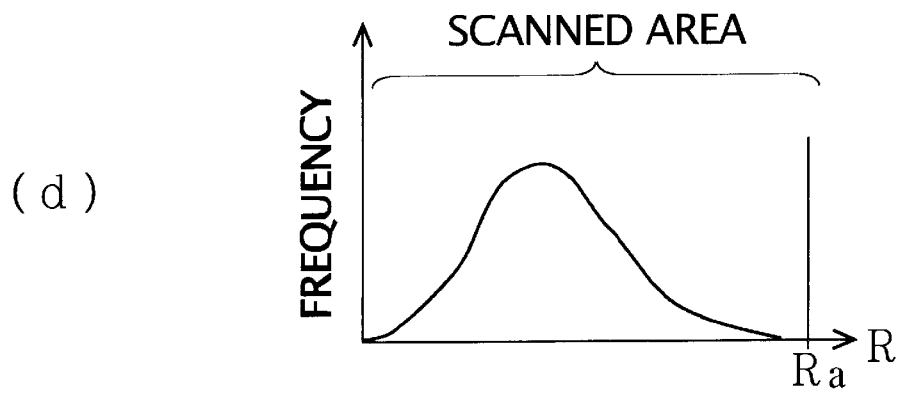

FIG.13
(a)
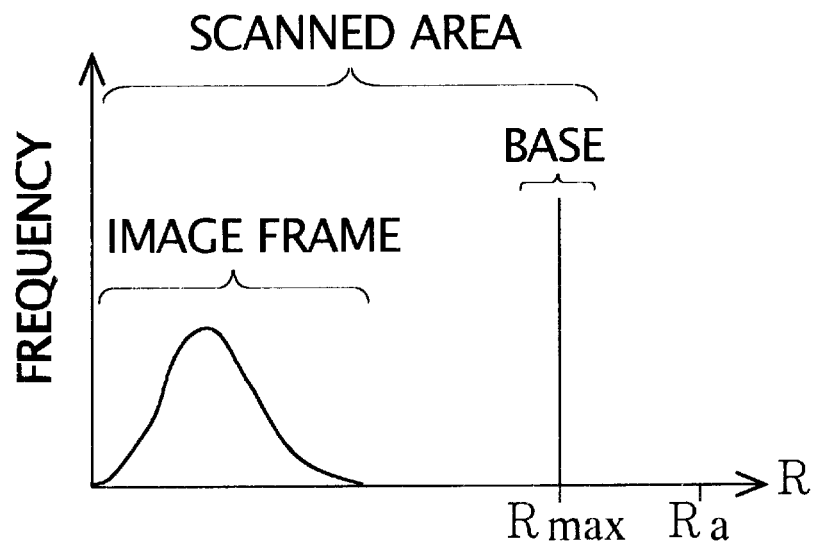
(b)
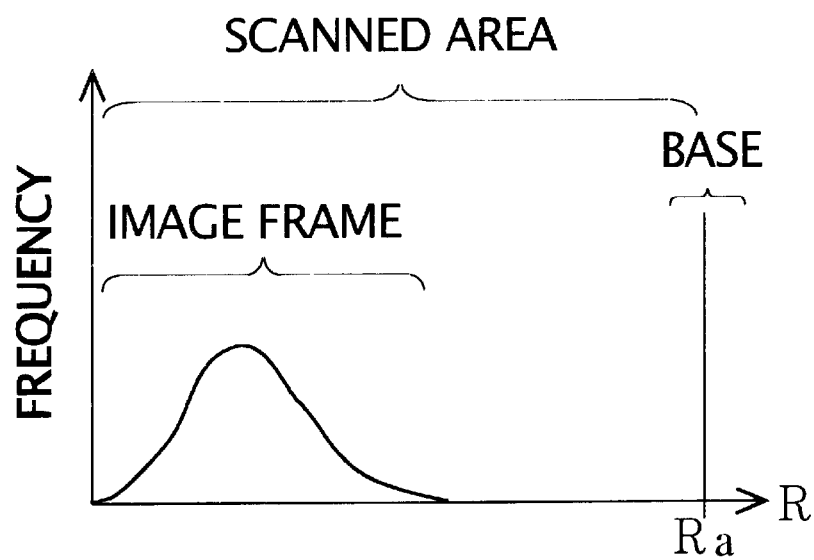

IMAGE SCANNING APPARATUS, CONTROL PROGRAM OF THE SAME, AND STORAGE MEDIUM FOR STORING CONTROL PROGRAM OF THE SAME

BACKGROUND OF THE INVENTION

1. Field of the Invention

The present invention relates to an image scanning apparatus for scanning an image on an original, a control program for controlling the same and a storage medium storing the control program.

2. Description of the Related Art

In an image scanning apparatus for acquiring a digital image by scanning an image on an original, a CCD photodetector has been heretofore used as a light receiving section of a scanning optical system for scanning the original. Herein, the original is a film, a printing original, and the like, and the image scanning apparatus is a so-called scanner.

FIG. 12(a) is a diagram showing a photoelectric-conversion characteristic of the CCD photodetector, that is, a relation between an exposure and an intensity.

The intensity R indicated by an output signal of the CCD photodetector becomes higher as the exposure I of the CCD photodetector increases. However, when the exposure I exceeds a quantization exposure limit Ia, the intensity R saturates at a constant value Ra.

Furthermore, when the exposure I exceeds an exposure Ia' slightly higher than the quantization exposure limit Ia, an "overflow" occurs.

Herein, the "overflow" signifies a phenomenon that charges are flown over the surroundings from a pixel in the CCD photodetector in which signal charges are to be held and an analog shift register in the CCD photodetector.

When this "overflow" occurs at any one of the plurality of pixels or at any one of the analog shift registers, a phenomenon called smear or blooming (hereinafter referred to as "overflow" phenomenon) occurs in an image finally obtained.

On the contrary, when the exposure I is insufficient, a dynamic range of the CCD photodetector is not effectively utilized, which deteriorates the SN ratio of an image signal and an overall quality of a finally obtained image.

Accordingly, in order to set an exposure condition that is proper (hereinafter referred to as a proper exposure condition), the conventional image scanning apparatus examines the intensity histogram of an image to be scanned before scanning it.

Herein, a pre-scan must be executed to examine the intensity histogram.

The pre-scan is a scanning performed under a predetermined exposure condition (specifically, an exposure condition in which an intensity does not saturate at scanning any image, that is, an exposure does not exceed a quantization exposure limit Ia in scanning any image.

Incidentally, the exposure condition is determined depending on a combination of a drive condition of an illumination optical system and a drive condition of a CCD photodetector, that is, a combination of a scanning light amount and a charge storage time. Accordingly, a predetermined exposure condition is set according to a predetermined scanning light amount and a predetermined charge storage time.

FIG. 12(b) is a drawing for explaining an original. Descriptions are made in the following for the case where the original to be scanned is a negative film.

In each film, a position of an image frame (an area in which an image is stored) 12a on the film varies depending on sorts of cameras used for photographing.

Accordingly, a scanning area 12E that is determined in advance in the image scanning apparatus has a range slightly wider than the image frame 12a.

FIG. 12(c) shows an intensity histogram that is acquired by a pre-scan.

The intensity histogram illustrates the intensity of the scanning area 12E ranges from 0 to Rmax. This range corresponds to a part of the dynamic range of the CCD photodetector, which ranges from 0 to Ra.

The image scanning apparatus refers to the intensity Rmax of the brightest point in the scanning area 12E (hereinafter to be referred to as "an absolute brightness point").

The image scanning apparatus sets the exposure condition so that the dynamic range of the CCD photodetector is effectively utilized in the scan, and in addition the exposure by this absolute brightness point does not exceed the an exposure limit.

To be specific, the image scanning apparatus sets the exposure condition to have the exposure in the scan Ra/Rmax times as much as the exposure in the pre-scan.

The exposure condition newly set described above is a proper exposure condition in the conventional image scanning apparatus.

FIG. 12(d) is an intensity histogram acquired by the scan.

This intensity histogram shows clearly that an intensity range of the scanning area 12E after the scan is expanded to the whole area of the dynamic range of the CCD photodetector, which ranges from 0 to Ra.

As a result, the S/N ratio of an image signal is enhanced to the maximum within a range where the overflow phenomenon does not occur.

Incidentally, as described above the scanning area 12E is set slightly wider than the image frame 12a.

Accordingly, the scanning area 12E includes not only the image frame 12a that is an effective picture but also a base 12b that is a non-effective picture.

Herein, the effective picture refers to a picture to be expressed in tones, and the non-effective picture refers to a picture which has a very high intensity compared to the effective picture and needs not to be expressed in tones.

Incidentally, the intensity histogram shown in FIG. 12(c) and FIG. 13(a) to be described later has two peaks.

Of these two peaks, the gentle peak on the low intensity side corresponds to intensity information of the image frame 12a, and the steep peak on the high intensity side corresponds to intensity information of the base 12b.

Accordingly, the intensity Rmax at the absolute brightness point is equal to an intensity of the base 12b.

Herein, if an object to be scanned is a comparatively bright image, an intensity in the intensity range of the image frame 12a is greatly lower than the intensity Rmax of the base 12b, as shown in FIG. 13(a).

However, the foregoing proper exposure condition is determined in accordance with the intensity Rmax at the absolute brightness point (the intensity at the base 12b), which may be a cause of the overflow. The proper exposure condition should not be determined in accordance with the intensity at the brightest point (hereinafter referred to as "the brightest point of picture") of the effective picture (image frame 12a).

Therefore, when the intensity range of the image frame 12a is significantly lower than the intensity Rmax of the base 12b, the intensity range allocated to the image frame 12a after the scan is still narrow as shown in FIG. 13(b), even when the foregoing proper exposure condition is set.

In this case, it has to be permitted a situation that the S/N ratio of the image signal remains small.

Furthermore, such a problem may occur in positive films in addition to negative films.

Such a problem arises, especially, when images such as a starry sky and metal goods are objects of scanning.

This is because these images contain a luminescent point that is a non-effective picture.

The same problem may occur regardless of types of the images to be scanned in a flatbed scanner (an image scanning apparatus where a film is placed on a transparent original stage larger than the film).

This is because, in the flatbed scanner, a full transmission area where the film is not placed is scanned together with an area where the film is placed.

To be more specific, the full transmission area becomes a non-effective picture having a significantly high intensity compared to an effective picture.

Note that, users of the flatbed scanner visualize images obtained by the pre-scanning, and distinguish the non-effective picture such as the foregoing base, luminescent point, and full transmission area from the effective picture. The users can cover the non-effective picture with a prepared mask.

However, this is a complicated processing for the users. Besides, it is very difficult to cover minute luminescent points with the mask.

SUMMARY OF THE INVENTION

An object of the present invention is to provide an image scanning apparatus capable of obtaining an image signal in high quality even when a non-effective picture exists in a scanning area, a control program for controlling the same, and a storage medium for storing the control program.

To achieve the objects, the image scanning apparatus in the present invention comprises a radiation unit for radiating a scanning light onto a scanning area where an original is arranged; a photodetector for detecting an optical image formed by the scanning light which is reflected in or transmits through the scanning area; a test drive unit for driving the radiation unit and the photodetector for which a predetermined drive condition is set; and an adjusting unit for adjusting the drive condition for the radiation unit and the photodetector in accordance with an output signal outputted from the photodetector by the driving, wherein the photodetector is a photodetector having an overflow drain mechanism, and the adjusting unit adjusts an exposure of the photodetector at a brightest point of an effective picture of the optical image so as to approach the quantization exposure limit of the photodetector. Accordingly, even if a non-effective picture exists in a scanning area, an image signal in high quality can be obtained.

The adjusting unit should preferably adjust the exposure of the photodetector at an absolute point of the effective picture of the optical image so as to fall within its overflow preventive range and adjust the exposure thereof at a brightest point of an effective picture of the optical image so as to approach the quantization exposure limit of the photodetector.

When the original is either a film or a reflective original and the optical image includes a high intensity area that is an image of a luminescent point on the original, the adjusting unit preferably adjusts an exposure of the photodetector in the high intensity area of the optical image to fall within the overflow preventive range of the photodetector, and adjust the exposure of the photodetector at the brightest point of the effective picture of the optical image to approach the quantization exposure limit of the photodetector.

The adjusting unit should preferably adjust the exposure of the photodetector at an absolute brightness point of the effective picture of the optical image so as to fall within its overflow preventive range and adjust the exposure thereof at a brightest point of an effective picture of the optical image so as to approach the quantization exposure limit of the photodetector.

When the optical image includes a high intensity area that is an optical image of an part of the original where the scanning light transmits and/or an area where the original is not arranged, the adjusting unit should preferably adjust the exposure of the photodetector in the high intensity area of the optical image so as to fall within the overflow preventive range of the photodetector, and adjust the exposure of the photodetector at the brightest point of the effective picture of the optical image so as to approach the quantization exposure limit of the photodetector.

To achieve the foregoing objects, the control program of the image scanning apparatus in the present invention is provided. The image scanning apparatus comprises: a radiation unit for radiating a scanning light onto a scanning area where an original is arranged; and a photodetector having an overflow drain mechanism, for detecting an optical image formed by the scanning light which is reflected in the scanning area or transmits therethrough. The control program includes: a test drive procedure for driving the radiation unit and the photodetector, for which a predetermined drive condition is set; and an adjusting procedure for adjusting the drive condition of the radiation unit and the photodetector in accordance with an output signal outputted from the photodetector by the driving. In the adjusting procedure, an exposure of the photodetector at a brightest point of an effective picture of the optical image is adjusted to approach the quantization exposure limit of the photodetector.

In the adjusting procedure, the exposure of the photodetector at an absolute brightness point of the optical image should be preferably adjusted to fall within the overflow preventive range of the photodetector, and the exposure of the photodetector at a brightest point of an effective picture of the optical image should be preferably adjusted to approach the quantization exposure limit of the photodetector.

When the original is either a film or a reflective original and the optical image includes a high intensity area that is an image of a luminescent point on the original, in the adjusting procedure an exposure of the photodetector in the high intensity area of the optical image is preferably adjusted to fall within the overflow preventive range of the photodetector, and the exposure of the photodetector at the brightest point of the effective picture of the optical image is preferably adjusted to approach the quantization exposure limit of the photodetector.

When the original is a negative film having a base and the optical image includes a high intensity area that is an optical image of the base, in the adjusting procedure the exposure of the photodetector in the high intensity area of the optical image is adjusted to fall within the overflow preventive range of the photodetector, and the exposure of the photodetector at the brightest point of the effective picture of the optical image is preferably adjusted to approach the quantization exposure limit of the photodetector.

When the optical image includes a high intensity area that is an optical image of a part of the original where the scanning light transmits and/or an area where the original is not arranged, in the adjusting procedure the exposure of the photodetector in the high intensity area of the optical image is preferably adjusted to fall within the overflow preventive range of the photodetector, and the exposure of the photodetector at the brightest point of the effective picture of the optical image is preferably adjusted to approach the quantization exposure limit of the photodetector.

To achieve the foregoing object, the storage medium for storing the control program of the image scanning apparatus in the present invention is provided. The storage medium comprises: a radiation unit for radiating a scanning light onto a scanning area where an original is arranged; and a photodetector having an overflow drain mechanism, for detecting an optical image formed by the scanning light which is reflected in the scanning area or transmits therethrough. The control program includes: a test drive procedure for driving the radiation unit and the photodetector, for which a predetermined drive condition is set; and an adjusting procedure for adjusting the drive condition of the radiation unit and the photodetector in accordance with an output signal outputted from the photodetector by the driving. In the adjusting procedure, an exposure of the photodetector at a brightest point in an effective picture of the optical image is adjusted to approach the quantization exposure limit of the photodetector.

In the adjusting procedure, the adjustment is preferably performed such that the exposure of the photodetector at an absolute brightness point of the optical image falls within the overflow preventive range of the photodetector, and the exposure of the photodetector at a brightest point of an effective picture of the optical image approaches the quantization exposure limit of the photodetector.

When the original is either a film or a reflective original and a high intensity area that is an image of a luminescent point on the original is included in the optical image, in the adjusting procedure the exposure of the photodetector in the high intensity area of the optical image is preferably adjusted to fall within the overflow preventive range of the photodetector, and the exposure of the photodetector at the brightest point of the effective picture of the optical image is preferably adjusted to approach the quantization exposure limit of the photodetector.

When the original is a negative film having a base and the optical image includes a high intensity area that is an optical image of the base, the adjustment is preferably performed in the adjusting procedure such that the exposure of the photodetector in the high intensity area of the optical image falls within the overflow preventive range of the photodetector, and the exposure of the photodetector at a brightest point of an effective picture of the optical image approaches the quantization exposure limit of the photodetector.

When the optical image includes a high intensity area that is an optical image of a part of the original where the scanning light transmits and/or an area where the original is not arranged, the adjustment is preferably performed in the adjusting procedure such that the exposure of the photodetector in the high intensity area of the optical image falls within the overflow preventive range of the photodetector, and the exposure of the photodetector at the brightest point of the effective picture of the optical image approaches the quantization exposure limit of the photodetector.

BRIEF DESCRIPTION OF THE DRAWINGS

FIG. 6(a) is a graph showing an intensity histogram obtained by a pre-scan.

FIG. 6(b) is a graph for explaining results of the image scanning processing in the first and second embodiments.

FIGS. 9(a) and 9(b) are drawings for explaining a luminescent point 2b existing in an image of a positive film 11.

FIG. 11(a) is a drawing showing an original 11 placed on a transparent original stage 41.

FIG. 11(b) is a graph showing an intensity histogram obtained by a pre-scan in a fourth embodiment.

FIG. 12(a) is a graph showing a photoelectric-conversion characteristic of a CCD photodetector.

FIG. 12(b) is a drawing for explaining an original.

FIG. 12(c) is a graph showing an intensity histogram that is acquired by a pre-scan.

FIG. 12(d) is a graph showing an intensity histogram that is acquired by a scan.

FIG. 13(a) is a graph showing an intensity histogram acquired by a pre-scan for an image in which an intensity in an intensity range of an image frame 12a is significantly lower than that of a base 12b.

FIG. 13(b) is a graph showing an intensity histogram acquired by a scan for an image in a conventional image scanning apparatus.

DETAILED DESCRIPTION OF THE PREFERRED EMBODIMENTS

Embodiments of the present invention will be described with reference to the accompanying drawings below.

[First Embodiment]

A first embodiment of the present invention will be first described with reference to FIGS. 1 to 6.

(Constitution)

Figure 1:
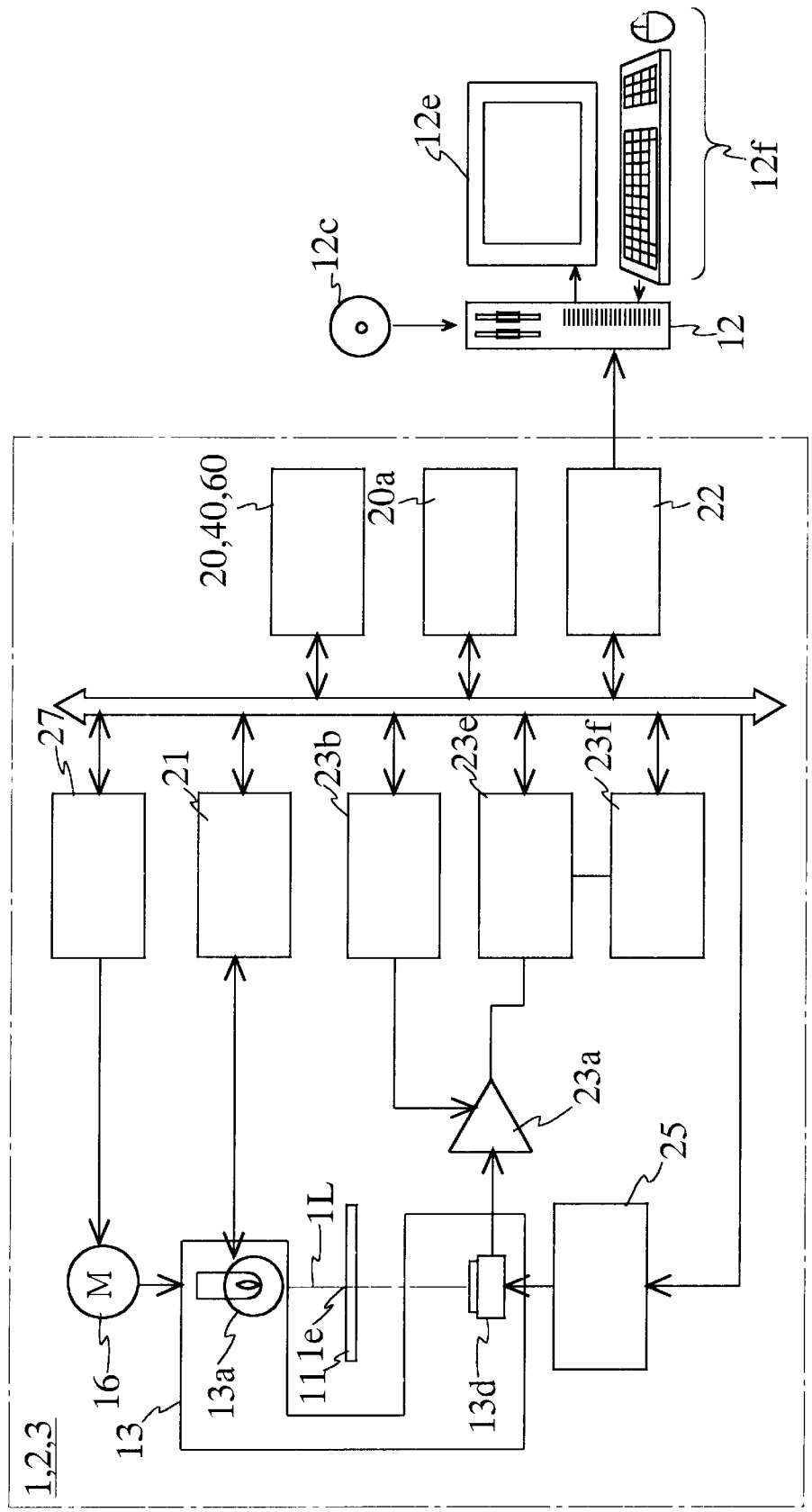
FIG. 1 shows a constitution of an image scanning apparatus of first to third embodiments.

FIG. 1 is a constitutional view of an image scanning apparatus 1 of this embodiment.

The image scanning apparatus 1 is connected to a host computer 12. Furthermore, the image scanning apparatus 1 mounts an original 11 to be scanned. In this embodiment, the original 11 is a negative film.

In the image scanning apparatus 1, a scanning light 1L which is emitted from a movable optical scanning unit 13 linearly illuminates the original (negative film) 11.

The optical scanning unit 13 comprises an illumination optical system 13a, a line sensor 13d and other optical systems with a predetermined positional relationship.

The illumination optical system 13a emits the scanning light 1L.

The line sensor 13d is a photodetector which receives transmitting light in an area (radiation area) 1e in the original (negative film) 11 radiated by the scanning light 1L, and photoelectrically detects an optical image of the radiation area 1e.

Figure 2:
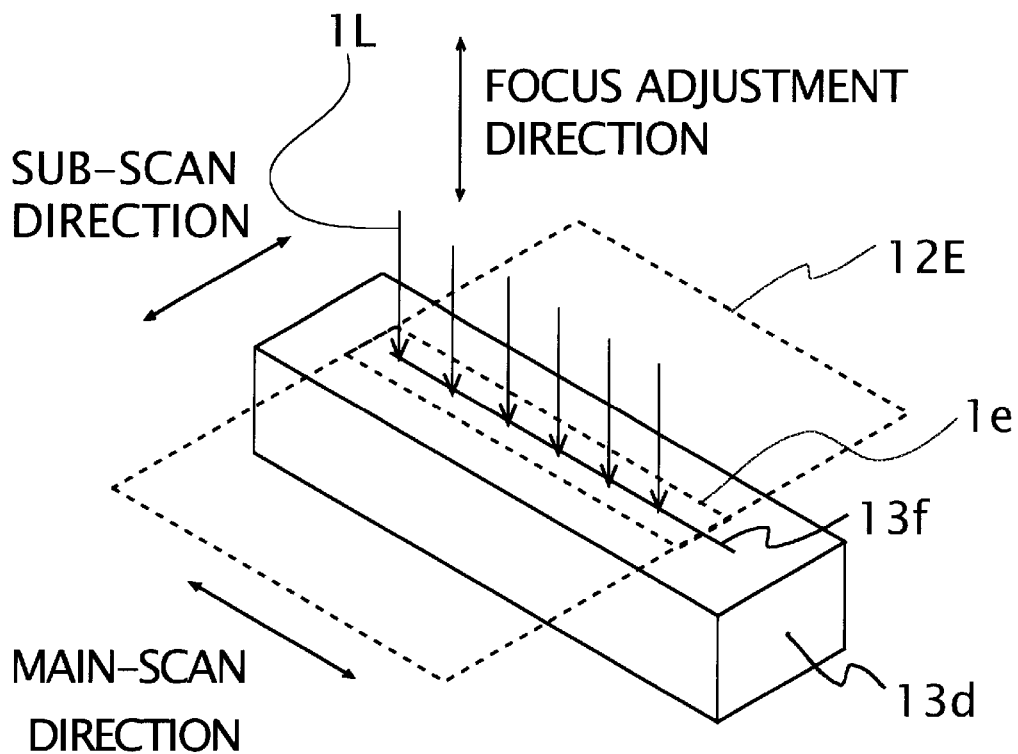
FIG. 2 is a drawing for explaining a relation between a scanning light 1L and a line sensor 13d.

FIG. 2 is a drawing for explaining a relation between the scanning light 1L and the line sensor 13d.

The line sensor 13d has a light receiving portion 13f in which a plurality of pixels are arranged in line.

The line sensor 13d is arranged in the optical scanning unit 13 in a state where a longitudinal direction of the light receiving portion 13f corresponds to a longitudinal direction of the radiation area 1e.

Although illustrations are omitted in FIG. 2, optical systems such as a mirror and a lens are arranged between the radiation area 1e and the line sensor 13d.

In order to secure a space for arranging these optical systems, the actual scanning light 1L may be deflected.

An arrangement angle of the line sensor 13d may also be different from that shown in FIG. 2 in accordance with the polarization of the scanning light 1L.

Herein, a direction along an optical axis of the scanning light 1L is referred to as a focus adjustment direction. A longitudinal direction of the radiation area 1e is referred to as a main-scan direction. A direction which is parallel with the original (negative film) 11 and perpendicular to the main-scan direction is referred to as a sub-scan direction.

The optical scanning unit 13 for emitting the scanning light 1L is movable within the image scanning apparatus 1 in order to scan the scanning area 12E of the original (negative film) by the radiation area 1e of the scanning light 1L. In this case, the optical scanning unit 13 moves in the sub-scan direction.

Incidentally, the optical scanning unit 13 is also movable in the focus adjustment direction to adjust its focus.

Figure 3:
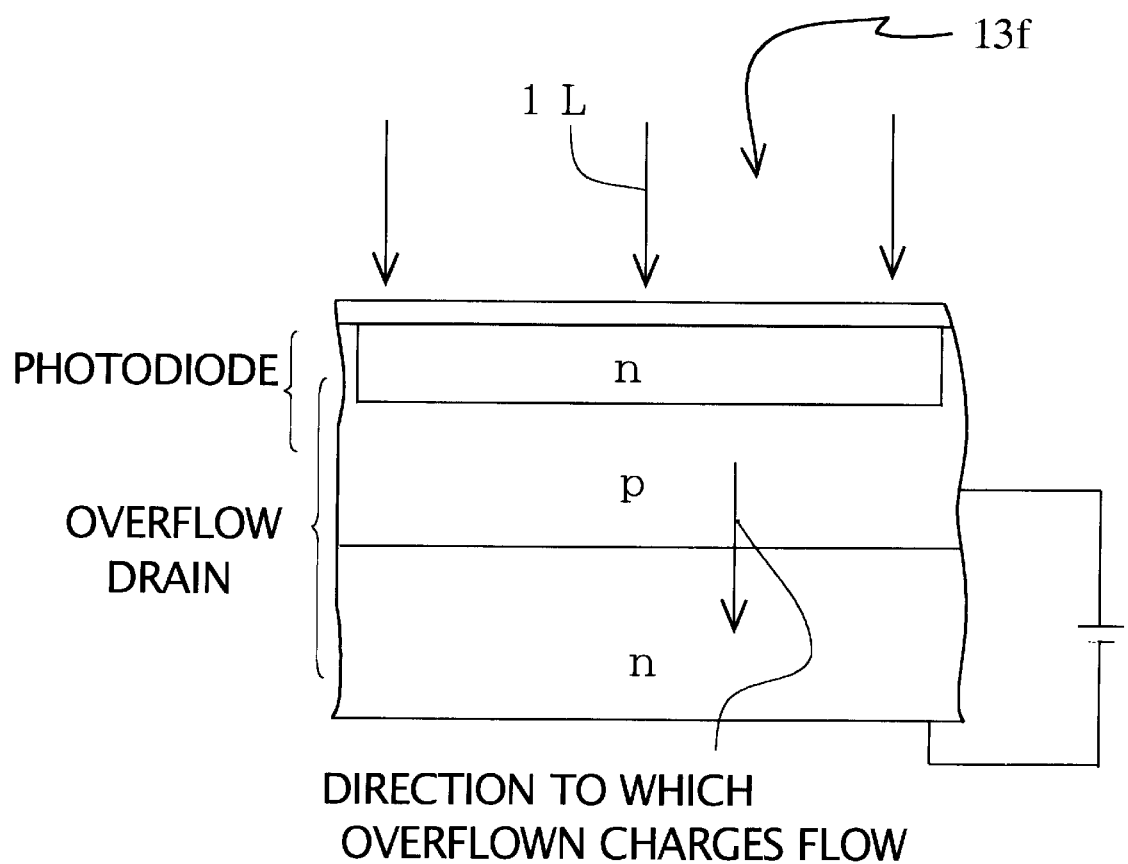
FIG. 3 is a drawing for explaining the line sensor 13d.

FIG. 3 is a drawing for explaining the line sensor 13d of this embodiment. Note that, FIG. 3 is an enlarged sectional view showing one pixel among the plurality of pixels arranged in the line sensor 13d.

First, the line sensor 13d of this embodiment is a CCD photodetector with an overflow drain mechanism.

The overflow drain mechanism is, for example, a longitudinal overflow drain mechanism.

In manufacturing steps of the line sensor 13d that is the CCD photodetector, which are generally semiconductor manufacturing processes, the longitudinal overflow drain mechanism is previously formed in a plane (back plane) opposite to a plane onto which the scanning light 1L is made to be incident.

Noted that, such a longitudinal overflow drain mechanism is an non-structural layer. Furthermore, the manufacturing steps are publicly known.

The name "longitudinal" is given to this overflow drain mechanism because charges overflown in each pixel are absorbed in the back plane direction.

Although a lateral overflow drain mechanism may be adopted instead of the longitudinal overflow drain mechanism, the longitudinal overflow drain mechanism is more preferable because pixels can be arranged with a high density.

Figure 4:
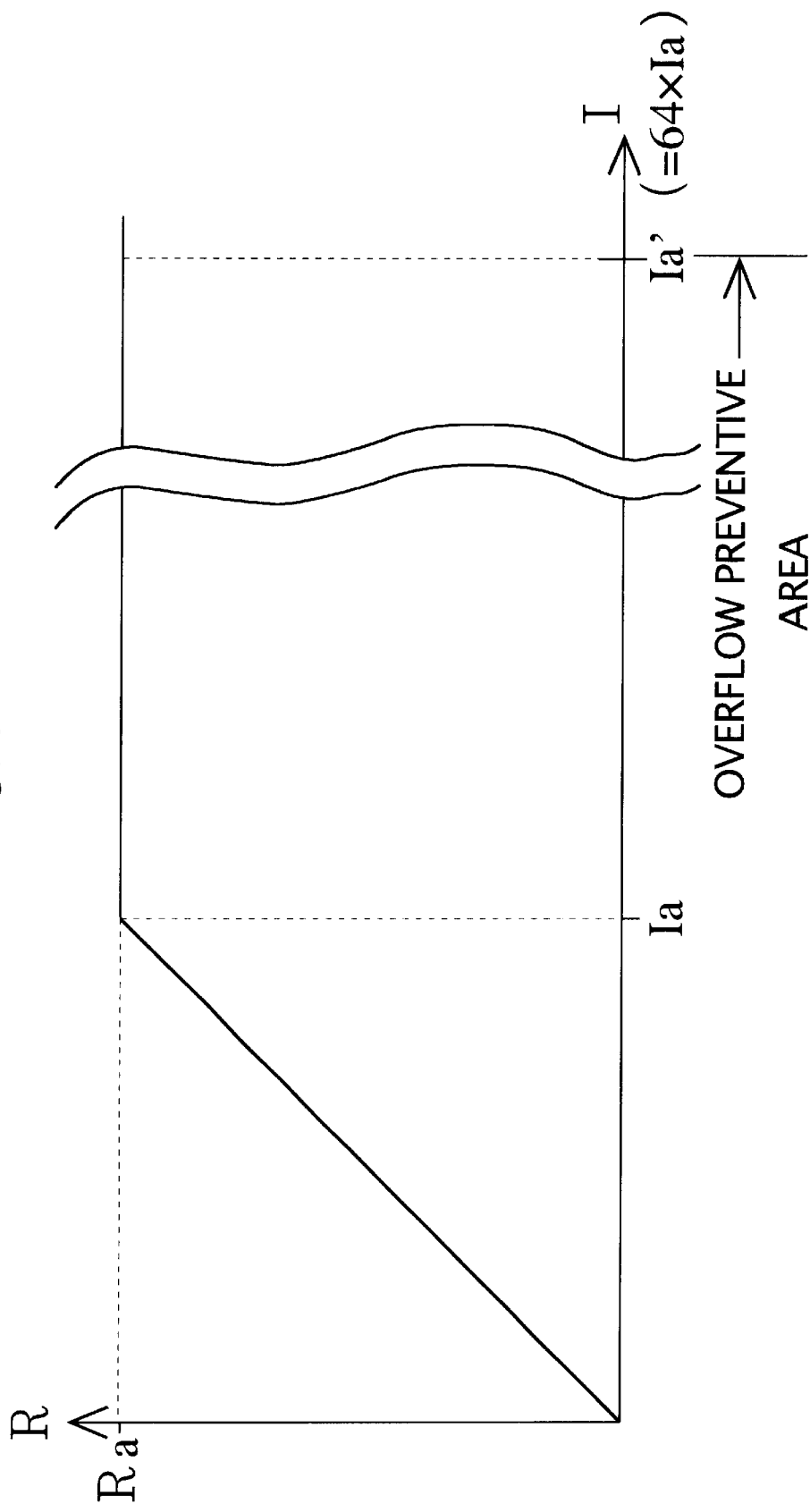
FIG. 4 is a graph for explaining a photoelectric conversion characteristic of the line sensor 13d.

FIG. 4 is a graph for explaining a photoelectric-conversion characteristic of the line sensor 13d.

An exposure limit Ia' of this line sensor 13d is remarkably elevated compared to that of the CCD photodetector used in the conventional image scanning apparatus.

The remarkable elevation of the exposure limit Ia' is due to a function of the foregoing overflow drain mechanism.

In this embodiment, a value of the exposure limit Ia' of the line sensor 13d shall be set to "64×Ia", where Ia is a quantization exposure limit.

The value of the exposure limit Ia' is measured together with the quantization exposure limit Ia in advance. Generally, the value of the exposure limit Ia' is often expressed by a value obtained by dividing a certain value by the quantization exposure limit Ia. For this reason, in this embodiment the exposure limit Ia' is expressed by a value obtained by dividing "64×Ia" by the quantization exposure limit Ia, that is, by 64.

In the specification, since a range where the exposure is equal to the exposure limit Ia' (=64×Ia) or less is an area where the overflow is suppressed, this area is referred to as an overflow preventive range.

Returning to FIG. 1, in the image scanning apparatus 1, provided are a scan mechanism 16, a unit drive circuit 27, a light amount control circuit 21, a line sensor drive circuit 25, an amplifier 23a, a gain setting circuit 23b, an A/D converter (A/D) 23e and a look-up table circuit (LUT) 23f.

The scan mechanism 16 allows the optical scanning unit 13 to move in the sub-scan direction.

The unit drive circuit 27 drives the scan mechanism 16 so as to move the optical scanning unit 13.

The light amount control circuit 21 drives the illumination optical system 13a to radiate the scanning light 1 onto the original (negative film) 11 and to control the light amount of the scanning light 1L.

The line sensor drive circuit 25 drives the line sensor 13d.

The amplifier 23a amplifies an intensity signal outputted from the line sensor 13d.

The gain setting circuit 23b sets a gain of the amplifier 23a.

The A/D converter circuit (A/D) 23e performs an A/D conversion for the intensity signal amplified by the amplifier 23a, thus acquiring intensity data.

The look-up table circuit 23f (LUT) allows the intensity data to be subjected to a gradation conversion.

The light control circuit 21 controls so that the scanning light 1L changes its wavelength from one to another among three kinds of the wavelengths in a pre-scan and a scan, each of which is one corresponding to colors R, G and B.

The LUT 23f has three kinds of look-up tables corresponding to these colors, to execute the gradation conversion suitable for the intensity data of the colors R, G and B.

In the image scanning apparatus 1, provided are a CPU 20, a memory 20a and an interface circuit (I/F) 22.

The CPU 20 is a control section of the image scanning apparatus 1 for issuing instructions to the circuits. The memory 20a is a storage area used for processing by the CPU 20. The interface circuit (I/F) 22 is a circuit establishing an interface with the external portions.

The image scanning apparatus 1 with the above-described constitution is connected to a host computer 12 via the interface circuit 22.

The CPU 20 supplied with the instruction from the host computer 12 executes an image scanning processing including the pre-scan and the scan in the image scanning apparatus 1.

When the CPU 20 acquires image data for one frame by the image scanning processing, the CPU 20 sends out the image data to the host computer 12.

The host computer 12 displays an image on a display device 12e based on the image data.

(Operation)

Figure 5:
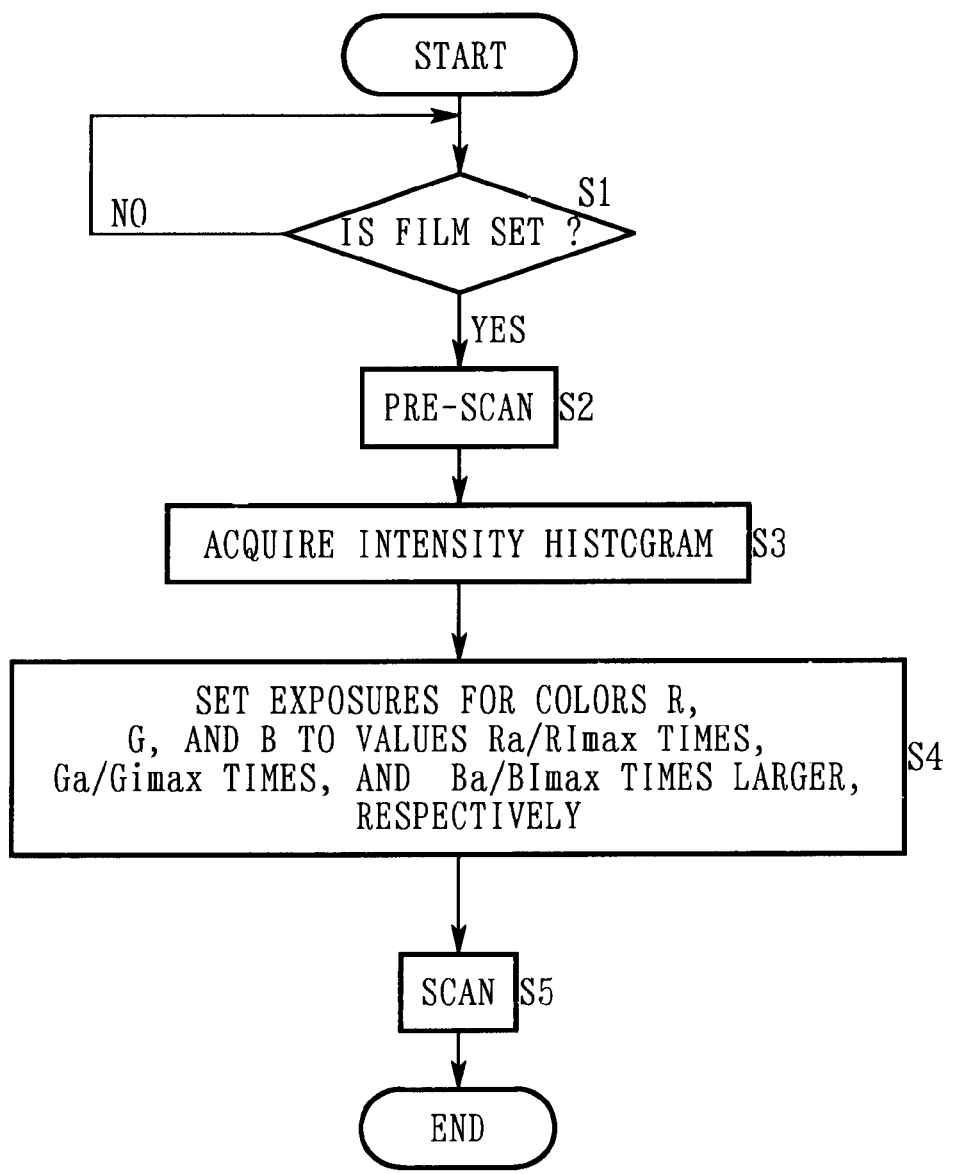
FIG. 5 is an operation flowchart for explaining an image scanning processing by a CPU 20.

FIG. 5 is an operation flowchart of the image scanning processing by the CPU 20 of this embodiment.

When the CPU 20 recognizes that the original (negative film) 11 is fitted to the image scanning apparatus 1 (YES in step S1), the CPU 20, the CPU 20 executes the pre-scan for the original 11 (step S2).

The CPU 20 in step S2 issues an instruction to the unit drive circuit 27, and the unit drive circuit 27 allows the optical scanning unit 13 to move in the sub-scan direction.

By this movement of the optical scanning unit 12, the radiation area 1e of the scanning light 1L scans the scanning area 12E on the original 11 in the sub-scan direction.

At this time, the CPU 20 sets a charge storage time of the line sensor 13d to a predetermined value via the line sensor drive circuit 25.

Furthermore, at this time, the CPU 20 sets the light amount of the scanning light 1L to a predetermined value via the light amount control circuit 21.

A predetermined exposure condition suitable for the pre-scan is kept constant by this setting. This predetermined exposure condition is the one in which an intensity does not saturate in scanning any image.

The CPU 20 keeps the gain of the amplifier 23a at 1 via the gain setting circuit 23b.

In the foregoing scan, the wavelength of the scanning light 1L is properly switched by the light amount control circuit 21 from one to another among three kinds of the wavelengths corresponding to the colors R, G and B.

The intensity signals for the colors R, G and B are obtained from the line sensor 13d by this switching.

The intensity signals for the colors R, G and B are converted to intensity data (digital signal) at the A/D converter 23e (step S2).

Then, the intensity data for the colors R, G and B in the foregoing scanning area 12E is processed by the CPU 20 as follows.

In step S3, the CPU 20 prepares an intensity histogram for each of the colors R, G and B based on the intensity data acquired.

Herein, dynamic ranges of the color R, the color G and the color B by the line sensor 13d are 0 to Ra, 0 to Ga and 0 to Ba, respectively.

Incidentally, when the number of output bits of the A/D converter 23e is 12 bits, upper limits Ra, Ga and Ba of the dynamic ranges of the colors R, G and B are 4095.

FIG. 6(a) is a drawing showing an intensity histogram obtained by the pre-scan.

Note that, in FIG. 6(a), the intensity histogram for the color R is representatively shown. In FIG. 6(a), the intensity histogram is shown when the intensity range 0 to RImax of the effective picture (herein, the image frame 12a) (see FIG. 12(b)) is discontinuous with the intensity Rmax of the non-effective picture (herein, the base 12b), that is, when the intensity range 0 to RImax of the effective picture is drastically lower than the intensity Rmax of the non-effective picture.

In step S4, the CPU 20 recognizes the intensity RImax of the brightest point of picture (herein, the brightest point of the image frame 12a) based on the intensity histogram of the color R.

Then, as a proper exposure condition for the color R in the scan, the CPU 20 sets the exposure to a value Ra/RImax times larger than that in the pre-scan.

Herein, in recognizing the intensity RImax of the brightest point of picture, the CPU 20 of this embodiment identifies that a remarkable peak with the highest intensity corresponds to the non-effective picture (herein, the base 12b), and peaks other than the peak correspond to the effective picture (herein, the image frame 12a).

Specifically, among the plurality of peaks (two peaks in many cases) appearing in the intensity histogram, the maximum value of the intensity range of the peaks, which exclude the peak with the highest intensity, is recognized as the intensity RImax of the brightest point of picture.

When the peak with the highest intensity and the peak with the second highest intensity are continuous, the intensity Rmax of the absolute brightness point and the intensity RImax of the brightest point of picture coincide with each other (In this case the intensity histogram is similar to that shown in FIG. 12(c)). Whether the peak with the highest intensity and the peak with the second highest intensity are continuous with each other is determined depending on whether the ratio of the intensity range where a frequency between the two peaks is 0, to the whole intensity range (0 to Ra) is lower than a predetermined value (for example, 10%).

In step S4, proper exposure conditions as to the color G and the color B are set similarly to the above descriptions.

Specifically, the CPU 20 recognizes the intensity GImax of the brightest point of picture based on the intensity histogram of the color G, and sets an exposure condition so that an exposure is Ga/GImax times as much as that in the pre-scan.

The CPU 20 recognizes the intensity BImax of the brightest point of picture based on the intensity histogram of the color B, and sets an exposure condition so that an exposure is Ba/BImax times as much as that in the pre-scan.

To set the exposure to a value n times as much as that in the pre-scan, a light amount of the scanning light emitted from the illumination optical system 13a may be set to a value n times as much as that in the pre-scan, or a charge storage time of the line sensor 13d may be set to a time n times as long as that in the pre-scan. Specifically, a combination of the charge storage time of the line sensor 13d and the light amount of the scanning light 1L may be changed in accordance with the rate n.

The CPU 20 makes these changes via the line sensor drive circuit 25 and the light amount control circuit 21.

Subsequently, in step S5, the CPU 20 performs a scan under this proper exposure condition (step S5).

The CPU 20 in step S5 changes the wavelength of the scanning light 1L from one to another among three kinds of the wavelengths corresponding to the colors R, G and B while allowing the optical scanning unit 13 to move in the sub-scan direction, thus obtaining intensity data for each of the colors R, G and B, respectively.

Among the operations of the CPU 20 in the scan (step S5), the operation of the CPU 20 in which the exposure condition is set to the foregoing proper exposure condition is different from that (step S2) of the CPU 20 in the pre-scan.

In addition, a predetermined gradation conversion is performed for each intensity data in the scan.

In this embodiment, since the original 11 is the negative film, this gradation conversion includes an inversion processing for the negative film.

Thereafter, the CPU 20 constructs image data for one frame, and sends out the image data to the computer 12. Thus, the image scanning processing is completed.

FIG. 6(b) is a graph for explaining results of the image scanning processing in this embodiment. In FIG. 6(b), an exposure histogram in the scan, in which the abscissa indicates the exposure, is illustrated.

The following description apply to obtaining intensity data of any of the colors R, G and B, similarly. Accordingly, description for the color R will be made representatively.

In the scan described above, since the exposure is Ra/RImax times as much as that in the pre-scan, the exposure I Imax at the brightest point of picture coincides with the quantization exposure limit Ia.

Accordingly, the effective picture (herein, the image frame 12a) is illustrated in all over the areas of the dynamic range 0 to Ra of the line sensor 13d. Image data illustrated in such a wide range have a proper SN ratio.

Then, in this embodiment, since the overflow drain mechanism is utilized, an occurrence of the overflow is avoided as long as the value of Rmax/RImax is not larger than "64" (that is, the numerical value representing the exposure limit Ia' of the line sensor 13d).

This is because if the value of the Rmax/RImax is no more than 64, the exposure Imax at the absolute brightness point is within the overflow preventive range of the line sensor 13d.

In this embodiment, as long as the respective values of the Rmax/RImax, Gmax/GImax and Bmax/BImax are not more than 64, it is possible to obtain high-quality image data without influences from the non-effective picture (herein, the base 12b).

The following effects can be obtained in this embodiment also when a non-effective picture other than the base 12b is included in the scanning area 12E.

For example, when an image in a negative film is the one obtained by photographing a crow in snow, the snow is identified as an effective picture, and the crow as a non-effective picture. At this time, while the crow is expressed all in black, light and shade of the snow is expressed fluently.

In this embodiment, it is possible to obtain high-quality image data more reliably by simply using the line sensor 13d having a more excellent characteristic (or in which the exposure limit Ia' is set at a higher value).

The image scanning apparatus 1 of this embodiment may be constituted such that after the completion of the foregoing image scanning processing, the image scanning apparatus 1 scan the original again when the overflow phenomenon is confirmed on an image displayed on the display device 12e. In scanning the original again, the exposure condition and the scanning area 12E are set in response to an instruction of the user.

[Second Embodiment]

Next, a second embodiment of the present invention will be described with reference to FIGS. 1, 5, 6, 7 and 8.

(Constitution)

An image scanning apparatus 2 of this embodiment is equivalent to that in which a CPU 40 is provided in stead of the CPU 20 in the image scanning apparatus 1 of the first embodiment shown in FIG. 1. Descriptions only for an operation of the CPU 40 are made, and descriptions for other constituent components are omitted.

(Operation)

Figure 7:
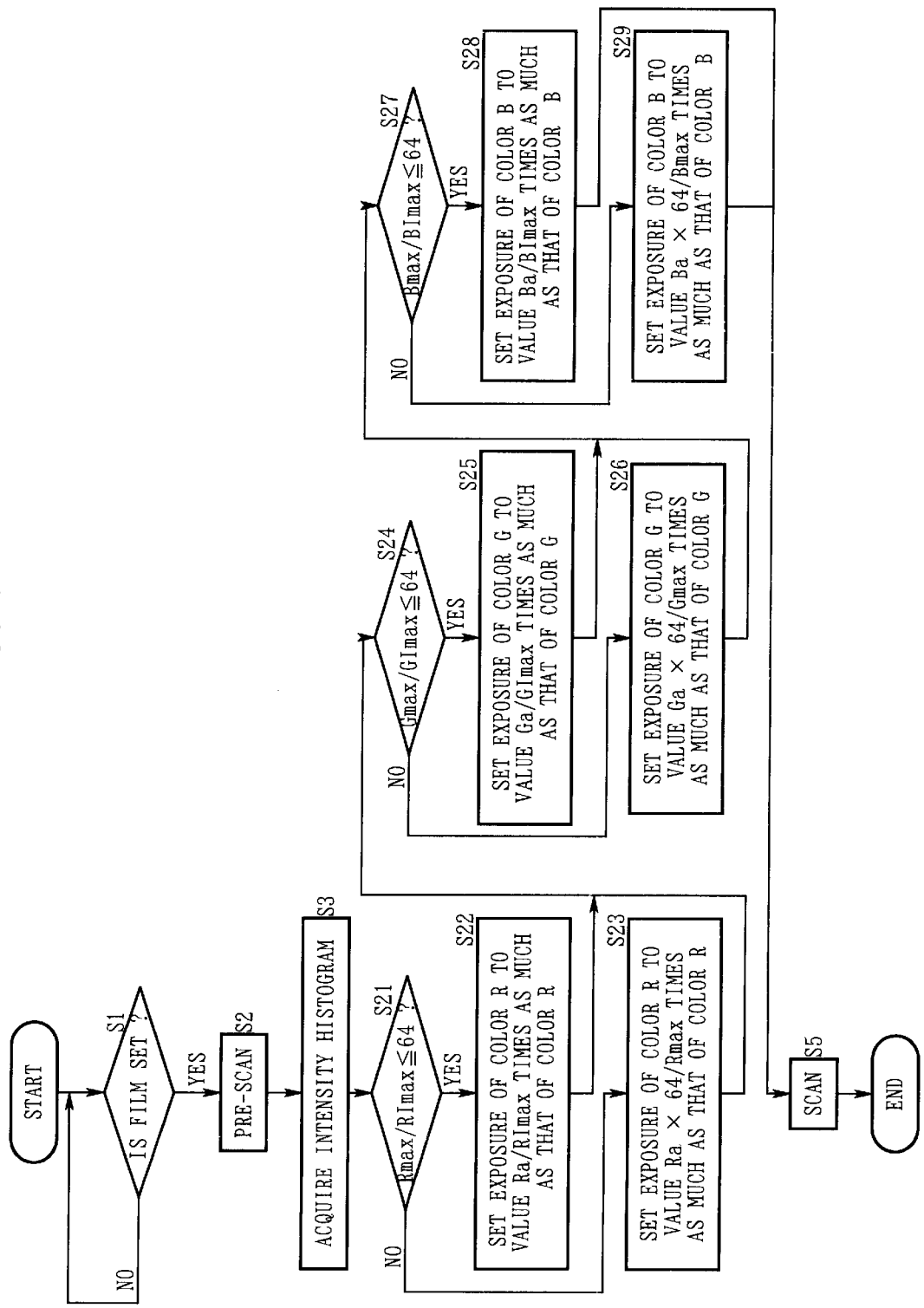
FIG. 7 is an operation flowchart of an image scanning processing by a CPU 40.

FIG. 7 is an operation flowchart of an image scanning processing by the CPU 40 of this embodiment. In FIG. 7, the same procedures as those shown in FIG. 5 are denoted by the same reference numerals, and descriptions for them are omitted.

The image scanning processing shown in FIG. 7 is equivalent to that to which steps S21 to S29 in stead of step S4 are added in the image scanning processing shown in FIG. 5.

The CPU 40 refers to the intensity RImax of the brightest point of picture and the intensity Rmax of the absolute brightness point in the intensity histogram as to the color R that is acquired in step S3, and decides whether the value of the Rmax/RImax exceeds "64" (that is a value of the exposure limit Ia' of the line sensor 13d (step S21).

Determined here is whether the exposure Imax by the absolute brightness point is within the overflow preventive range of values (see FIG. 6(b)) in case the exposure in the scan is set to a value Ra/RImax times larger that in the pre-scan.

When, as a result of step S21, the CPU 40 recognizes that the exposure Imax by the absolute brightness point is within the overflow preventive range (YES in step S21), the procedure advances to step S22. In step S22, an exposure condition is set as the proper exposure condition for the color R so that an exposure in the scan is Ra/RImax times as much as that in the pre-scan.

This exposure condition is the same as that in step S4 shown in FIG. 5. Therefore, according to this exposure condition, the exposure I Imax by the brightest point of picture coincides with the quantization exposure limit Ia as shown in FIG. 6(b).

On the other hand, as a result of step S21, when it is recognized that the exposure Imax by the absolute brightness point is not within the overflow preventive range of values (NO in step S21), the CPU 40 advances its procedure to step S23.

In step S23, the proper exposure condition for the color R, which is an exposure in the scan is Ra×64/Rmax times larger that in the pre-scan, is set.

Figure 8:
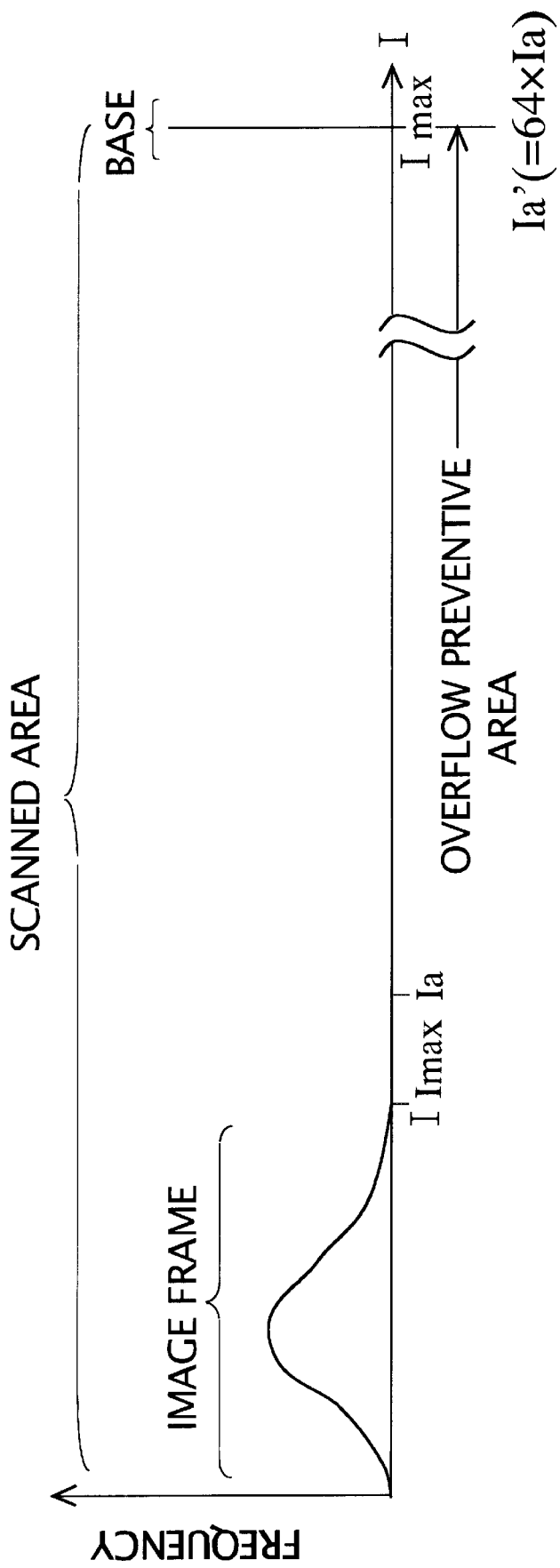
FIG. 8 is a graph for explaining results of an image scanning processing in the second embodiment.
Figure 10:
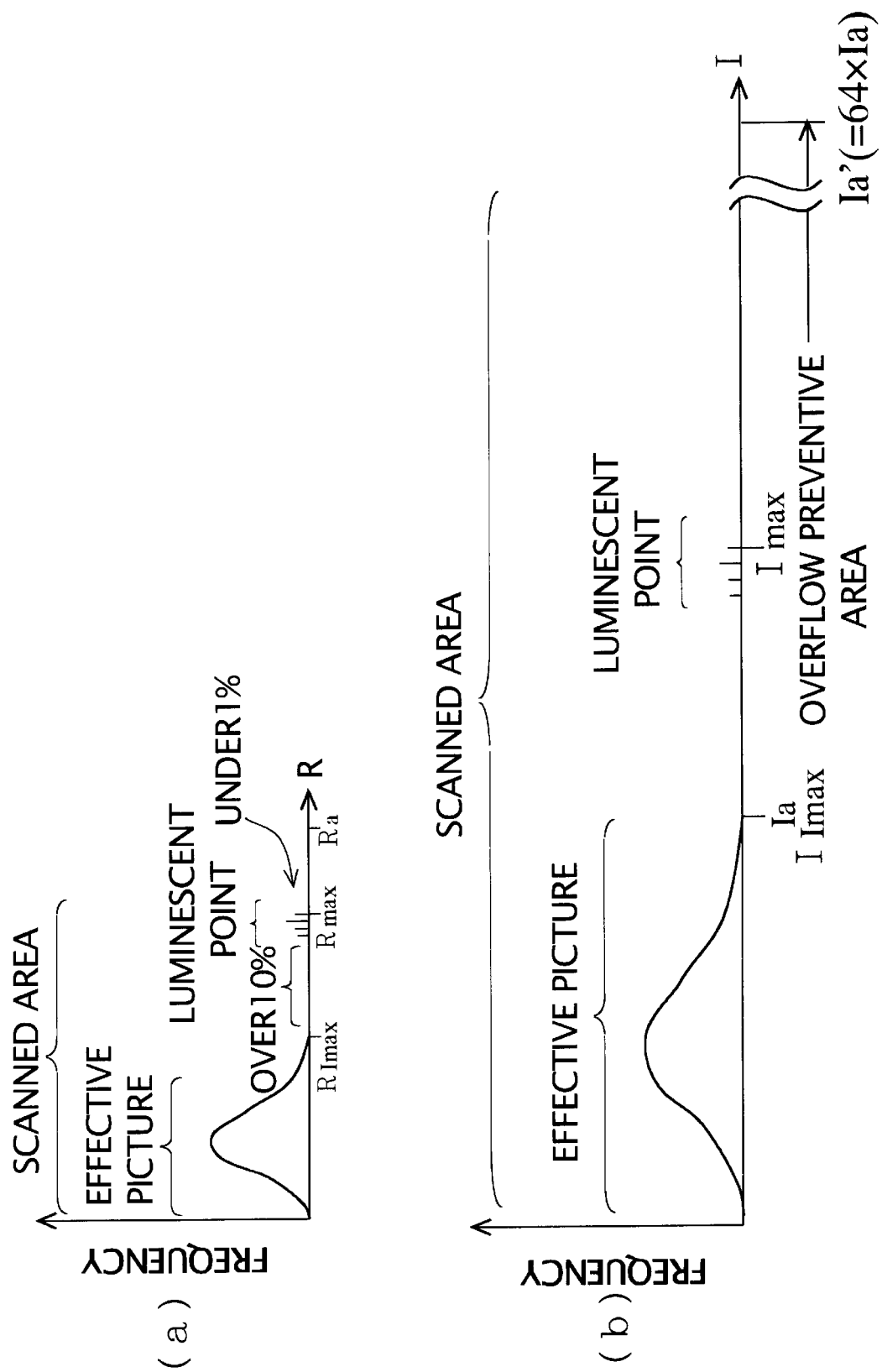
FIG. 10(a) is a graph showing an intensity histogram obtained by a pre-scan in the third embodiment.
FIG. 10(b) is a graph for explaining results of an image scanning processing of the third embodiment.

Under the exposure condition, the exposure Imax by the absolute brightness point coincides with the exposure limit Ia' as shown in FIG. 8. This exposure Imax is the highest exposure within a range where no overflow occurs.

As a result, in this embodiment, the exposure I Imax by the brightest point of picture is made to approach the quantization exposure limit Ia while the exposure Imax by the absolute brightness point is made to fall within the overflow preventive range of values (see FIGS. 6(b) and 8).

The same processing as steps S21, S22 and S23 described above is executed also for the colors G and B.

Specifically, the CPU 40 recognizes the intensity GImax of the brightest point of picture and the intensity Gmax of the absolute brightness point based on the intensity histogram of the color G, and decides whether or not the value of Gmax/GImax exceeds 64 (step S24). When the value of Gmax/GImax is below 64, the CPU 40 sets the exposure for the color G to Ga/GImax times as much as that in the pre-scan (step S25). When the value of Gmax/GImax is above 64, the CPU 40 sets the exposure for the color G to Ga×64/Gmax times as much as that in the pre-scan (step S26).

Moreover, the CPU 40 recognizes the intensity BImax of the brightest point of picture and the intensity Bmax of the absolute brightness point based on the intensity histogram of the color B, and decides whether or not the value of Bmax/BImax exceeds 64 (step S27). When the value of Bmax/BImax is below 64, the CPU 40 sets the exposure for the color B to Ba/BImax times as much as that in the pre-scan (step S28). When the value of Bmax/BImax is above 64, the CPU 40 sets the exposure for the color B to Ba×64/Bmax times as much as that in the pre-scan (step S29).

When step 23 is executed, the exposure I Imax by the brightest point of picture is below the quantization exposure limit Ia as shown in FIG. 8. Therefore, in order to standardize the intensity signal, the CPU 40 issues an instruction to the gain setting circuit 23b to allow the gain setting circuit 23b to set a gain of the amplifier 23a for the color R to Ra/((64×Ra/Rmax)×RImax).

When the value of Ra/((64×Ra/Rmax)×RImax) exceeds the maximum value of the gain that can be set in the amplifier 23a, the gain of the amplifier 23a for the color R is set to this maximum value, and a shortage to the value of Ra/((64×Ra/Rmax)×RImax), which is to be amplified, may be amplified in the look-up table circuit 23f. Incidentally, in the amplification of the look-up table circuit 23f, the contents of the look-up table corresponding to the color R may be changed so that the gradation range is converted for enlargement.

The amplification of the foregoing intensity signal is performed similarly for each of the colors G and B.

Specifically, when step S26 is executed, the CPU 40 issues an instruction to the gain setting circuit 23b to allow the gain setting circuit 23b to set a gain of the amplifier 23a for the color G to Ga/((64×Ga/Gmax)×GImax). When step S29 is executed, the CPU 40 issues an instruction to the gain setting circuit 23b to allow the gain setting circuit 23b to set a gain of the amplifier 23a for the color B to Ba/((64×Ba/Bmax)×BImax).

At this time, when the value of Ga/((64×Ga/Gmax)×GImax) exceeds the maximum value of the gain that can be set to the amplifier 23a, the gain of the amplifier 23a for the color G is set to this maximum value, and a shortage to the value of Ga/((64×Ga/Gmax)×GImax), which is to be amplified, may be amplified in the look-up table circuit 23f.

When the value of Ba/((64×Ba/Bmax)×BImax) exceeds the maximum value of the gain that can be set to the amplifier 23a, the gain of the amplifier 23a for the color B is set to this maximum value, and a shortage to the value of Ba/((64×Ba/Bmax)×BImax), which is to be amplified, may be amplified in the look-up table circuit 23f.

As described above, according to the present invention, the possibility of the occurrence of the overflow phenomenon is judged (step S21, S24 and S27). When there is the possibility of the occurrence of the overflow phenomenon, steps S23, S26 and S29 in stead of steps S22, S25 and S28 are executed, respectively.

As a result, the effective picture is expressed in the widest intensity range where the overflow phenomenon does not occur.

[Third Embodiment]

Next, a third embodiment of the present invention will be described with reference to FIGS. 1, 5, 7, 9, and 10.

(Constitution)

An image scanning apparatus 3 of this embodiment is equivalent to that in which a CPU 60 is provided in stead of the CPU 20 in the image scanning apparatus 1 of the first embodiment shown in FIG. 1.

An operation flowchart of an image scanning processing by the CPU 60 is the same as those shown in FIGS. 5 and 7.

In this embodiment, an original 11 that is to be scanned is a positive film.

Since the original 11 is the positive film, operations of the CPU 60 differ partially from those of the CPU 20 and the CPU 40, which were described above.

The difference of the operations between the CPU 60, and the CPUs 20 and 40 is the manner of obtaining the intensities RImax, GImax and BImax of the brightest point of picture. In the following, description on the manner of obtaining will be made, and other descriptions are omitted.

(Operation)

FIGS. 9(a) and 9(b) are drawings for explaining a luminescent point 2b existing in an image of the original (positive film) 11.

For example, in the image including a starry sky as shown in FIG. 9(a), the luminescent point 2b corresponding to a star corresponds to a non-effective picture. A landscape such as houses corresponds to an effective picture.

When this landscape is to be expressed in fluent gradation, influences by the luminescent point 2b has to be removed.

In the image including metal goods such as an electric train showing luster as shown in FIG. 9(b), the luminescent point 2b corresponding to a luster portion corresponds to a non-effective picture. An object to be photographed corresponds to an effective picture.

When this object is to be expressed in fluent gradation, influences by the luminescent point 2b must be removed.

FIG. 10(a) is a graph showing an intensity histogram obtained by a pre-scan in this embodiment. In FIG. 10(a), the intensity histogram for the color R is shown representatively.

In the original (positive film) 11, there is an image in which the luminescent point 2b exists and an image in which the luminescent point 2b does not exist.

Even in the case where the luminescent point 2b exists, an intensity of the luminescent point 2b differs depending on the respective images.

Accordingly, the CPU 60 of this embodiment has to decide a specific peak indicating the luminescent point 2b based on the intensity histogram.

In this embodiment, the CPU 60 refers to a frequency corresponding to a peak with the highest intensity among a plurality of peaks appearing in the intensity histogram.

When the ratio of the frequency to the total frequency is below a predetermined value, for example, 1%, and the peak with the highest intensity is discontinuous to a peak with the second highest intensity, the CPU identifies the peak with the highest intensity as a specific peak representing the luminescent point 2b.

The discontinuity is determined depending on whether, between the two peaks, the ratio of an intensity range where the frequency is zero to the whole intensity range (0 to Ra) is smaller than a predetermined value, for example, 10%.

The items to be described below apply to the acquirement of intensity data of the colors R, G, and B, similarly. Accordingly, description on the color R will be made.

As a result of the foregoing decision, when the existence of the luminescent point 2b is identified, the CPU 60 recognizes the maximum value of the intensity range of the peak representing the picture other than the luminescent point 2b as the intensity RImax of the brightest point of picture.

FIG. 10(b) is a graph for explaining a result of an image scanning processing. Noted that in FIG. 10(b), an exposure histogram in a scan is shown.

As is clear from FIG. 10(b), according to the present invention, a high quality image data can be obtained without being affected by the luminescent point 2b.

In this embodiment described above, since the origin 11 is the positive film, an inversion processing required for a negative film is omitted.

(Fourth Embodiment)

Next, a fourth embodiment of the present invention will be described with reference to FIGS. 1, 5, 7 and 11.

In this embodiment, an image scanning apparatus of the present invention is applied to a flatbed scanner.

Specifically, the image scanning apparatus of this embodiment uses a transparent original stage as a supporting means for supporting the original 11 in the image scanning apparatus (see FIG. 1) in the foregoing embodiments.

Noted that each of optical systems and a drive mechanism are arranged so that the original on the transparent original stage can be properly scanned.

FIG. 11(a) is a drawing showing the original 11 placed on the transparent original stage 41.

The figure shows a state where a plurality of negative films is placed at any optional position on the transparent original stage 41. In this embodiment, it is assumed that the original 11 be a negative film.

As described above, the fact that the user of the image scanner apparatus can place the original (negative film) 11 at any optional position of the transparent original stage 41 implies that the image scanning apparatus is incapable of recognizing in advance a position of the original (negative film) 11.

Therefore, in the image scanning apparatus of this embodiment, an object to be scanned is previously set in a comparatively broad scanning area 12E.

Accordingly, an area 4c where the original (negative film) 11 is not placed will be included in the scan area 12E. Since the whole of scanning light perfectly transmits through this area, the area is referred to as a full transmission area.

Incidentally, after the scan, the user performs separations of necessary portions and unnecessary portions from each other among the scanned images on software installed in the host computer 12.

Herein, an operation flowchart of the image scanning processing by a CPU of this embodiment is approximately the same as those shown in FIG. 5 or FIG. 7.

An operation of the CPU of this embodiment differs partially from the operations of the CPUs 20, 40 and 60, which are described above. Descriptions are made for difference between them.

FIG. 11(*b*) is a graph showing an intensity histogram obtained by a pre-scan in this embodiment.

Similarly to the intensity histograms shown in the foregoing embodiments (see FIGS. 6(*a*), 8, and 10(*a*)), a peak corresponding to an effective picture (herein, an image frame of the negative film) and a peak corresponding to a non-effective picture (herein, a base of the negative film) appear in this intensity histogram.

However, the difference from the intensity histograms shown in the foregoing embodiments is that in this intensity histogram the peak corresponding to the full transmission area 4c appears closer to the high intensity side.

Accordingly, the CPU in the image scanning processing of this embodiment recognizes the maximum value of the intensity range of the third peak from the high intensity side as the intensity RImax of the brightest point of picture.

When the operation flowchart shown in FIG. 7, which is executed in this embodiment, is adopted, an intensity of a peak corresponding to the full transmission area 4c is considered as the intensity Rmax of the absolute brightness point.

As a result, a high quality image data can be obtained without being affected by the full transmission area 4c.

Specifically, the high quality image data can be obtained in this embodiment without covering the full transmission area 4c of the flatbed scanner with a mask or the like.
(Others)

Noted that the present invention can be applied to both of a transmission type image scanning apparatus and a reflection type image scanning apparatus.

Herein, the transmission type image scanning apparatus refers to the one which utilizes the scanning light 1L transmitted through the original 11. The reflection type image scanning apparatus refers to the one which utilizes the scanning light 1L reflected from the original 11.

In the foregoing embodiments, any of the threshold values of the decision in steps S21, S24 and S27, the coefficients in steps S23, S26 and S29 and the coefficient multiplied by the denominator of the gain, which is set for the amplifier 23a to standardize the intensity signal, are 64. The reason why the threshold value and the coefficients are 64 is that the value of the exposure limit Ia' of the line sensor 13d is equal to 64×Ia. The threshold value and the coefficients are generally equal to Ia'/Ia, where Ia' is the exposure limit, and Ia is the quantization exposure limit.

In the foregoing embodiments, the CPU incorporated in the image scanning apparatus executes the image scanning processing as shown in FIGS. 5 and 7. However, the image scanning processing may be wholly or partially executed by the CPU in the host computer 12.

For example, the storage medium 12c which stores a program for executing procedures of the image scanning processing either partially or wholly is prepared. The user may install this image scanning program in the host computer 12 via the storage medium 12c.

The user may download this program as driver software or firmware from a predetermined home page on Internet onto the host computer 12.

To execute such a download, while accessing the predetermined home page from the home computer 12, the user may select a film scanner as image scanning apparatus from products display on the screen, or select driver software or firmware adaptable to the OS environment of the host computer 12.

The following dial-up connection can be applied as a connection form between the host computer 12 and Internet.

Specifically, the host computer 12 is connected to a phone line through a modem or a terminal adapter, and connected, through the phone line, to a modem or a terminal adapter of a provider as an Internet connection service company.

The modem or the terminal adapter of the provider is connected to a server, and the server is connected to 24 hour Internet through a router for establishing a relay channel.

The host computer 12 is connected to the Internet through the server of the provider by making a call if necessary.

A connection form of the host computer 12 and Internet is not limited to such a dial-up connection, and a connection form in which a dedicated line normally connects the provider thereto may be adopted.

What is claimed is:

1. An image scanning apparatus comprising:
   a radiation unit for radiating scanning light onto a scanning area on which an original is arranged;
   a photodetector for detecting an optical image formed by said scanning light which is reflected in or transmits through said scanning area;
   a test drive unit for driving said radiation unit and said photodetector under a predetermined drive condition; and
   an adjusting unit for adjusting the drive condition for said radiation unit and said photodetector in accordance with an output signal outputted by the driving from said photodetector, wherein:
   said photodetector has an overflow drain mechanism; and
   said adjusting unit performs said adjustment such that an exposure of said photodetector at a brightest point of an effective picture of said optical image approaches a quantization exposure limit of said photodetector.

2. The image scanning apparatus according to claim 1, wherein
   said adjusting unit performs said adjustment such that an exposure of said photodetector at an absolute brightness point of said optical image falls within an overflow preventive range of values of said photodetector and an exposure of said photodetector at a brightest point of an effective picture of said optical image approaches a quantization exposure limit of said photodetector.

3. The image scanning apparatus according to claim 1, wherein:

said original is one of a film and a reflective original;

said optical image includes a high intensity area that consists of an image of a luminescent point on said original; and said adjusting unit performs said adjustment such that an exposure of said photodetector in said high intensity area of said optical image falls within an overflow preventive range of values of said photodetector and an exposure of said photodetector at a brightest point of an effective picture of said optical image approaches a quantization exposure limit of said photodetector.

4. An image scanning apparatus according to claim 1, wherein said original is a negative film with a base;

said optical image includes a high intensity area that consists of an image of said base; and said adjusting unit performs said adjustment such that an exposure of said photodetector in said high intensity area of said optical image falls within an overflow preventive range of values of said photodetector and an exposure of said photodetector at a brightest point of an effective picture of said optical image approaches a quantization exposure limit of said photodetector.

5. The image scanning apparatus according to claim 1, wherein said optical image includes a high intensity area that consists of an optical image of a part of said original where said scanning light transmits and/or an area where said original is not arranged; and said adjusting unit performs said adjustment such that an exposure of said photodetector in said high intensity area of said optical image falls within an overflow preventive range of values of said photodetector and an exposure of said photodetector at a brightest point of an effective picture of said optical image approaches a quantization exposure limit.

6. A control program of an image scanning apparatus which comprises: a radiation unit for radiating scanning light onto a scanning area on which an original is arranged; and a photodetector having an overflow drain mechanism, for detecting an optical image formed by said scanning light which is reflected in or transmits through said scanning area, the control program comprising:

a test drive procedure for driving said radiation unit and said photodetector under a predetermined drive condition; and an adjusting procedure for adjusting the drive condition for said radiation unit and said photodetector in accordance with an output signal outputted by the driving from said photodetector, wherein said adjustment is performed such that an exposure of said photodetector at a brightest point of an effective picture of said optical image approaches a quantization exposure limit of said photodetector.

7. The control program according to claim 6, wherein in said adjusting procedure, said adjustment is performed such that an exposure of said photodetector at an absolute brightness point of said optical image falls within an overflow preventive range of values of said photodetector and an exposure of said photodetector at a brightest point of an effective picture of said optical image approaches a quantization exposure limit of said photodetector.

8. The control program according to claim 6, wherein said original is one of a film and a reflective original;

said optical image includes a high intensity area that consists of an image of a luminescent point on said original; and in said adjusting procedure, said adjustment is performed such that an exposure of said photodetector in said high intensity area of said optical image falls within an overflow preventive range of values of said photodetector and an exposure of said photodetector at a brightest point of an effective picture of said optical image approaches a quantization exposure limit of said photodetector.

9. The control program according to claim 6, wherein said original is a negative film with a base;

said optical image includes a high intensity area that consists of an image of said base; and in said adjusting procedure, said adjustment is performed such that an exposure of said photodetector in said high intensity area of said optical image falls within an overflow preventive range of values of said photodetector and an exposure of said photodetector at a brightest point of an effective picture of said optical image approaches a quantization exposure limit of said photodetector.

10. The control program according to claim 6, wherein said optical image includes a high intensity area that consists of an optical image of a part of said original where said scanning light transmits and/or an area where said original is not arranged; and in said adjusting procedure, said adjustment is performed such that an exposure of said photodetector in said high intensity area of said optical image falls within an overflow preventive range of values of said photodetector and an exposure of said photodetector at a brightest point of an effective picture of said optical image approaches a quantization exposure limit.

11. A storage medium for storing a control program of an image scanning apparatus which comprises: a radiation unit for radiating scanning light onto a scanning area on which an original is arranged; and a photodetector having an overflow drain mechanism, for detecting an optical image formed by said scanning light which is reflected in or transmits through said scanning area, the control program comprising:

a test drive procedure for driving said radiation unit and said photodetector under a predetermined drive condition; and an adjusting procedure for adjusting the drive condition for said radiation unit and said photodetector in accordance with an output signal outputted by the driving from said photodetector, wherein said adjustment is performed such that an exposure of said photodetector at a brightest point of an effective picture of said optical image approaches a quantization exposure limit of said photodetector.

12. The storage medium according to claim 11, wherein in said adjusting procedure, said adjustment is performed such that an exposure of said photodetector at an absolute brightness point of said optical image falls within an overflow preventive range of values of said photodetector and an exposure of said photodetector at a brightest point of an effective picture of said optical image approaches a quantization exposure limit of said photodetector.

13. The storage medium according to claim 11, wherein said original is one of a film and a reflective original;

said optical image includes a high intensity area that consists of an image of a luminescent point on said original; and in said adjusting procedure, said adjustment is performed such that an exposure of said photodetector in said high intensity area of said optical image falls within an overflow preventive range of values of said photodetector and an exposure of said photodetector at a brightest point of an effective picture of said optical image approaches a quantization exposure limit of said photodetector.

14. The storage medium according to claim 11, wherein said original is a negative film with a base;

said optical image includes a high intensity area that consists of an image of said base; and in said adjusting procedure, said adjustment is performed such that an exposure of said photodetector in said high intensity area of said optical image falls within an overflow preventive range of values of said photodetector and an exposure of said photodetector at a brightest point of an effective picture of said optical image approaches a quantization exposure limit of said photodetector.

15. The storage medium according to claim 11, wherein said optical image includes a high intensity area that consists of an optical image of a part of said original where said scanning light transmits and/or an area where said original is not arranged; and in said adjusting procedure, said adjustment is performed such that an exposure of said photodetector in said high intensity area of said optical image falls within an overflow preventive range of values of said photodetector and an exposure of said photodetector at a brightest point of an effective picture of said optical image approaches a quantization exposure limit.

* * * * *